US012293362B2

(12) United States Patent
Vashisht et al.

(10) Patent No.: US 12,293,362 B2
(45) Date of Patent: May 6, 2025

(54) ARTIFICIAL INTELLIGENCE BASED PRODUCT RECOMMENDATION METHODS AND SYSTEMS FOR ENHANCING APPROVALS OF PAYMENT PROCESSING REQUESTS

(71) Applicant: MASTERCARD INTERNATIONAL INCORPORATED, Purchase, NY (US)

(72) Inventors: Puneet Vashisht, Gurgaon (IN); Gaurav Dhama, Gurgaon (IN); Ankur Arora, New Delhi (IN); Siddharth Vimal, Chandigarh (IN); Hardik Wadhwa, Bangalore (IN)

(73) Assignee: MasterCard International, Inc., Purchase, NY (US)

( * ) Notice: Subject to any disclaimer, the term of this patent is extended or adjusted under 35 U.S.C. 154(b) by 492 days.

(21) Appl. No.: 17/674,367

(22) Filed: Feb. 17, 2022

(65) Prior Publication Data
US 2022/0261875 A1 Aug. 18, 2022

(30) Foreign Application Priority Data
Feb. 17, 2021 (IN) .............................. 202141006574

(51) Int. Cl.
*G06Q 20/12* (2012.01)
*G06Q 20/04* (2012.01)
(Continued)

(52) U.S. Cl.
CPC ........... *G06Q 20/401* (2013.01); *G06Q 20/04* (2013.01); *G06Q 20/12* (2013.01); *G06Q 30/0631* (2013.01)

(58) Field of Classification Search
None
See application file for complete search history.

(56) References Cited

U.S. PATENT DOCUMENTS 6,999,943 B1 2/2006 Johnson et al.
7,309,008 B2 12/2007 Anderson et al.
(Continued)

OTHER PUBLICATIONS

Jain et al., "Payment Fraud Prevention for Merchants", Aug. 1, 2018, 11 pages, https://info1.exlservice.com/hubfs/EXL-WP-Payment-Fraud-Prevention-for-Merchants.pdf.
(Continued)

*Primary Examiner* — William J Jacob
(74) *Attorney, Agent, or Firm* — Barta Jones, PLLC

(57) ABSTRACT

Recommendations of one or more authorizing components are provided to issuers and/or merchants for enhancing approval rates of payment processing requests. A server system receives a payment authorization request for a payment transaction between a cardholder and a merchant in real time. Payment transaction features associated with the payment transaction are identified based on the payment authorization request. A combination of one or more authorizing components to be applied to the payment transaction is predicted to obtain a product recommendation strategy for the payment transaction. The combination of one or more authorizing components is predicted based on a trained machine learning model and the payment transaction features. The payment authorization request and the product recommendation strategy are transmitted to an issuer associated with the cardholder.

20 Claims, 11 Drawing Sheets

(51) Int. Cl.
  *G06Q 20/40* (2012.01)
  *G06Q 30/0601* (2023.01)

(56) References Cited

U.S. PATENT DOCUMENTS

| | | | |
|---|---|---|---|
| 9,922,360 B2 | 3/2018 | Hendrick et al. | |
| 10,002,348 B1* | 6/2018 | Doctor | G06Q 20/401 |
| 10,373,140 B1 | 8/2019 | Chang et al. | |
| 10,387,795 B1 | 8/2019 | Oldridge et al. | |
| 11,107,157 B1* | 8/2021 | Kerof | G06Q 40/03 |
| 2007/0174105 A1* | 7/2007 | Abe | G06Q 10/0637 |
| | | | 705/7.29 |
| 2010/0287099 A1* | 11/2010 | Liu | G06Q 20/40 |
| | | | 235/380 |
| 2017/0148027 A1 | 5/2017 | Yu et al. | |
| 2018/0040064 A1 | 2/2018 | Grigg et al. | |
| 2020/0134628 A1* | 4/2020 | Jia | G06N 20/00 |
| 2020/0193438 A1* | 6/2020 | Cohn | G06Q 20/40 |
| 2021/0125179 A1* | 4/2021 | Mach | G06Q 20/401 |
| 2021/0256529 A1* | 8/2021 | Cohn | G06Q 20/381 |
| 2021/0406896 A1* | 12/2021 | Chaturvedi | G06Q 20/405 |
| 2022/0122079 A1* | 4/2022 | Cohn | G06Q 20/108 |

OTHER PUBLICATIONS

Yan, Rong, "Square's Machine Learning Infrastructure and Applications", Aug. 1, 2014, 1 page, https://www.slideshare.net/g33ktalk/squares-machine-learning-infrastructure-and-applications.

Ramanathan, Karthik, "How AI is Transforming the Payments Experience", Jan. 31, 2019, 1 page, https://newsroom.mastercard.com/asia-pacific/2019/01/31/how-ai-is-transforming-the-payments-experience/.

Jung, Haebichan, "How Data Science Work Reveals Hidden Trends in Payment Success Rates" Recurly, Jul. 3, 2019, 5 pages, https://blog.recurly.com.

Unknown, "How it Works, A payment recovery solution, built to reduce churn", 2021, 2 pages, https://www.flexpay.io/how-it-works/.

Unknown, "Payment Optimization", 2022, 6 pages, https://www.firstdata.com/en_us/products/merchants/authorization-optimization.html.

Kong, Robirt, "How to Reduce Payment Card Decline Rates on Your Online Store" Jul. 29, 2019, 1 page, https://fastspring.com/blog/how-to-reduce-payment-card-decline-rates-on-your-online-store/.

Quick, Rachel, "Benchmarking & Minimizing Credit Card Transaction Decline Rates" Recurly, Mar. 31, 2016, 4 pages, https://blog.recurly.com/benchmarking-minimizing-credit-card-transaction-decline-rates.

Mora, Andreu, "Predicting and monitoring payment volumes with Spark and Elastic Search" Adyen, Oct. 9, 2019, 1 page, https://www.adyen.com/blog/predicting-and-monitoring-payment-volumes-with-spark-and-elasticsearch.

Jung, Haebichan, "How Data Science Work Reveals Hidden Trends in Payment Success Rates" Recurly, Jul. 3, 2019, 10 pages, https://blog.recurly.com/how-data-science-work-reveals-hidden-trends-in-payment-success-rates.

Unknown, "Payments Orchestration Layer, Necessary functionality in the payments stack", Aug. 22, 2019, 28 pages, http://rpgc.com/wp-content/uploads/2019/08/Payments-Orchestration-Layer-Necessary-functionality-in-the-payments-stack-1.pdf.

\* cited by examiner

ARTIFICIAL INTELLIGENCE BASED PRODUCT RECOMMENDATION METHODS AND SYSTEMS FOR ENHANCING APPROVALS OF PAYMENT PROCESSING REQUESTS

CROSS-REFERENCE TO RELATED APPLICATION

This application claims priority to Indian Patent Application No. 202141006574 filed Feb. 17, 2021, entitled "ARTIFICIAL INTELLIGENCE BASED PRODUCT RECOMMENDATION METHODS AND SYSTEMS FOR ENHANCING APPROVALS OF PAYMENT PROCESSING REQUESTS", the entirety of which is incorporated herein by reference.

TECHNICAL FIELD

The present disclosure relates to artificial intelligence processing systems and, more particularly to, electronic methods and complex processing systems for recommending an optimal combination of authorization decision products to issuers or merchants for enhancing approval rates of payment processing requests.

BACKGROUND

Payment networks enable various types of payment transactions. A "card-not-present (CNP)" transaction is a type of payment transaction in which a consumer buys a product/service without the presence of a physical payment card (e.g., debit card, credit card, prepaid card). In such transactions (e.g., online/e-commerce, card-on-file), the payment card information is transmitted from a merchant, along with a flag that the payment transaction is a CNP transaction. In one example, the CNP payment transaction includes online transactions, where a consumer utilizes a personal device to access a merchant web site, and the consumer selects products to be purchased. During a checkout processing, the consumer provides payment account information, such as a credit-card or debit-card number, to the merchant. The merchant then generates a payment authorization request utilizing the payment card information, and the payment authorization request is communicated to an issuer for processing. Another example of the CNP payment transaction includes over-the-phone transactions, where a consumer keys in or verbally states payment card information.

It is noted that these online transactions may get declined by the issuer due to various reasons (such as, incorrect user input, high fraud score, insufficient funds availability), frequently, compared to the offline mode transactions.

Further, since the CNP payment transactions are less secure than in-person and mobile contactless transactions, merchants are advised to take additional precautions when accepting CNP payment transactions. Even, issuers also utilize fraud scoring models for the CNP payment transactions that may sometime decline legitimate CNP transactions as well. That mistake, however, may have huge intangible and adverse side effects, because the mistake discourages and disappoints legitimate cardholders who may stay away for months and never come back for performing the payment transactions.

To improve approval rates of the CNP payment transactions, the payment networks provide a wide variety of authorization decision products to issuers and merchants. Each authorization decision product may handle specific type of payment transaction decline.

However, it is very difficult for the issuers/merchants to decide in real-time which authorization decision products to be applied to a particular payment transaction such that an approval rate is maximum and a fraud rate is minimum.

Thus, there exists a technological need for a technical solution for finding which authorization decision products are needed to be applied to a particular payment transaction in the card-not-present (CNP) payment transactions using automated means.

SUMMARY

Various embodiments of the present disclosure provide systems, methods and electronic devices for recommending one or more authorizing components to issuers and/or merchants for enhancing approval rates of payment processing requests.

In an embodiment, a server system is disclosed. The server system includes a communication interface, a memory including executable instructions and a processor communicably coupled to the communication interface and the memory. The processor includes a data-processing engine, a reinforcement learning (RL) agent, and a product recommendation engine. The data pre-processing engine is operable to receive a payment authorization request for a payment transaction between a cardholder and a merchant in real time and identify payment transaction features associated with the payment transaction based, at least in part, on the payment authorization request. The RL agent is operable to predict a combination of one or more authorizing components to be applied to the payment transaction to obtain a product recommendation strategy for the payment transaction. The combination of one or more authorizing components is predicted based, at least in part, on a trained machine learning model and the payment transaction features. The product recommendation engine is operable to transmit the payment authorization request and the product recommendation strategy to an issuer associated with the cardholder.

In another embodiment, a computer-implemented method is disclosed. The computer-implemented method performed by a server system includes receiving a payment authorization request for a payment transaction between a cardholder and a merchant in real time. The computer-implemented method includes identifying payment transaction features associated with the payment transaction based, at least in part, on the payment authorization request. The computer-implemented method further includes predicting a combination of one or more authorizing components to be applied to the payment transaction to obtain a product recommendation strategy for the payment transaction. The combination of one or more authorizing components is predicted based, at least in part, on a trained machine learning model and the payment transaction features. The computer-implemented method includes transmitting the payment authorization request and the product recommendation strategy to an issuer associated with the cardholder.

BRIEF DESCRIPTION OF THE FIGURES

For a more complete understanding of example embodiments of the present technology, reference is now made to the following descriptions taken in connection with the accompanying drawings in which.

Figure 1:
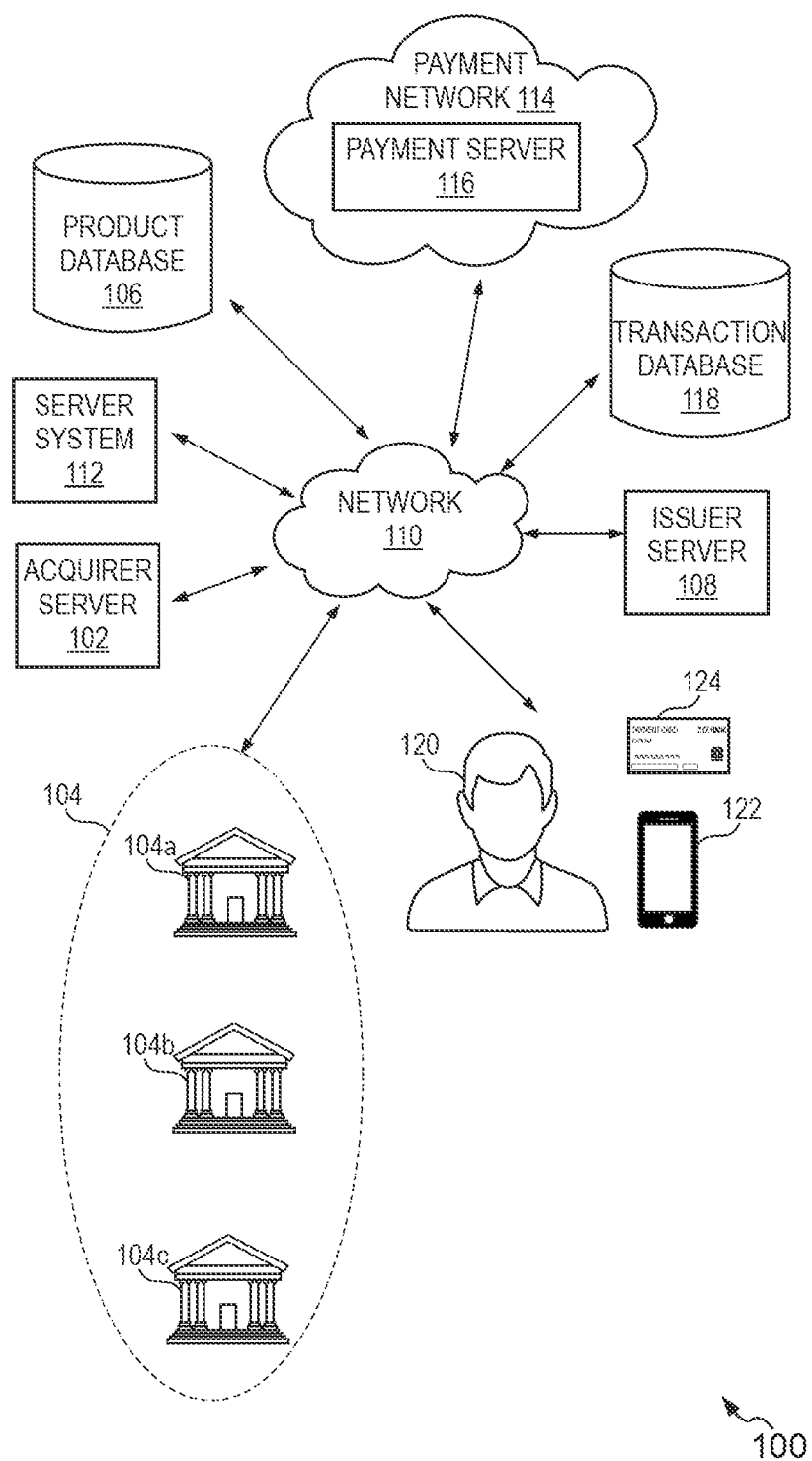
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" used throughout the description refer to a financial account that is used to fund a financial transaction (interchangeably referred to as "card-not-present payment transaction"). Examples of the financial account include, but are not limited to, a savings account, a credit account, a checking account, and a virtual payment account. The financial account may be associated with an entity such as an individual person, a family, a commercial entity, a company, a corporation, a governmental entity, a non-profit organization, and the like. In some scenarios, a financial account may be a virtual or temporary payment account that can be mapped or linked to a primary financial account, such as those accounts managed by payment wallet service providers, and the like.

The term "payment network", used herein, refers to a network or collection of systems used for the transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes that may include payment cards, letters of credit, checks, financial accounts, etc. Examples of networks or systems configured to perform as payment networks include those operated by such as, Mastercard®.

The term "merchant", used throughout the description generally refers to a seller, a retailer, a purchase location, an organization, or any other entity that is in the business of selling goods or providing services, and it can refer to either a single business location, or a chain of business locations of the same entity.

The terms "cardholder" and "customer" are used interchangeably throughout the description, and refer to a person who holds a credit or a debit card that will be used by a merchant to perform a card-not-present (CNP) payment transaction.

The terms "products" and/or "authorizing components", used throughout the description generally refer to a number of services or products offered by Mastercard® or any third party entities which can be helpful for issuers/merchants to make authorization decisions of various types of payment transactions. For example, an Automatic Billing Updater (ABU) is a product offered by Mastercard® for acquirers or merchants. This product includes helpful tables correlating old and new account numbers (e.g., for payment card accounts) when an account restructuring (such as, card expirations) has taken place.

Overview

Various example embodiments of the present disclosure provide methods, systems, user devices and computer program products for enhancing approval rates of payment processing requests by recommending application of one or authorizing components to payment transactions to issuers, in real time. The one or more authorizing components help the issuers in taking authorization decisions and are configured to decline fraud transactions. The system determines which all authorizing components issuers and/or merchants should apply on a particular transaction so as to maximize the approval probability while minimizing the fraud probability. The system also optimizes the cost of applying an authorizing component to the payment transaction for the issuers and/or merchants.

In an example, the present disclosure describes a server system that provides a product recommendation strategy to issuers along with payment authorization requests in real time. The product recommendation strategy includes recommendation for the issuers to apply an optimal combination of authorizing components to payment transactions. The server system includes at least a processor and a memory. In one non-limiting example, the server system is a payment server. The server system is configured to receive a payment authorization request for a payment transaction between a cardholder and a merchant. In one embodiment, the payment transaction is a card-not-present (CNP) payment transaction. The server system is configured to identify payment transaction features associated with the payment transaction based, at least in part, on the payment authorization request. The payment transaction features may include, but not limited to, an issuer identifier, a merchant category code (MCC), a cross-border transaction flag, and a payment card type (credit/debit), etc.

In one embodiment, the server system is configured to predict a combination of one or more authorizing components to be applied to the payment transaction for obtaining a product recommendation strategy for the payment transaction. The combination of one or more authorizing components is predicted based, at least in part, on a trained machine learning model and the payment transaction features. In one embodiment, the trained machine learning model is a deep reinforcement learning model. The deep reinforcement learning model is trained based, at least in part, on historical transaction data associated with the issuer within a particular time duration (for example, last 6 months). The historical transaction data includes transaction-level data associated with past payment transaction requests and what all authorizing components were applied by the issuer to the past payment transaction requests. In other words, the server system may further be configured to intensively learn the historical transaction data of the issuer, to realize a more intelligent authorizing component recommendation modeling. The techniques of the present disclosure integrate data of past payment transactions and authorizing components which were applied by the issuer for authorizing the past payment transactions and then provide recommendation.

Thus, the server system needs to decide in real-time what authorizing components to recommend to the issuer for applying to a payment transaction. Reinforcement learning is an example method to model intelligent decision-making.

In one embodiment, to predict the combination of the one or more authorizing components to be applied to the payment transaction, the server system is configured to determine a state in the deep reinforcement learning model based on the payment transaction features. The server system is configured to set application of a candidate number of authorizing components to the payment transaction as actions in the deep reinforcement learning model.

Thereafter, the server system is configured to calculate Q-values corresponding to state-action pairs formed by the state and the actions using a neural network of the deep reinforcement learning model. The server system is configured to select an action (i.e., application of a candidate authorizing component to the payment transaction) based at least on the calculated Q-values and epsilon greedy policy methods. The server system is configured to calculate a reward value corresponding to the selected action based, at least in part, on a reward function. The reward function is based on approval and fraud probability scores of a payment transaction type associated with the payment transaction and a cost of applying the selected candidate authorizing component to the payment transaction.

The server system is configured to add the candidate authorizing component corresponding to the reward value satisfying a predefined condition into the product recommendation strategy. Then, the server system is configured to transmit the payment authorization request and the product recommendation strategy to an issuer associated with the cardholder.

Various embodiments of the present disclosure offer multiple advantages and technical effects. For instance, the present disclosure provides a system for enhancing approval rates of payment processing requests by recommending application of one or authorizing components to payment transactions to issuers. The system will try to find an optimal path by exploring different paths a payment transaction can take in terms of applying optimal authorizing components for the payment transaction. The system also constantly learns from the real-time payment transactions and feedbacks loop on whether the payment transaction was approved or declined or was marked as fraud. Thus, the system provides a cost-effective solution to the issuer as well as merchant in terms of deciding how the payment transaction should be processed and which all authorizing components need to be applied on a payment transaction.

The product recommendation method and system provided by the present disclosure perform accessing past transaction-level data of issuers and/or merchants and information of authorizing components which were applied by the issuers and/or merchants in a preset time interval according to some data constraints (such as, CNP payment transaction) and generate payment transaction attributes based on each payment transaction type associated with the past transaction-level data. Since application of the authorizing components to a payment transaction is set by the issuers and/or merchants based on the payment transaction attributes. Therefore, the techniques of the present disclosure apply deep reinforcement learning over the payment transaction features or attributes of payment transactions to learn more optimal authorizing components, to improve the approval rates of the payment transactions and to reduce fraud rates. In addition, the extraction and dimension reduction are applied to the multiple operational behaviors to further enhance the efficiency of reinforcement learning.

Additionally, the system also captures unforeseen changes performed by the issuers in strategies of applying authorizing components to a payment transaction in a particular domain (such as, jewelry merchants) for improving the approval rates in the particular domain and updates the product recommendation strategy according to the unforeseen changes. Thus, the deep reinforcement learning model allows the system to generate the best optimal product recommendation strategy for issuers based on their past decisions on application of authorizing components to the payment transactions.

Various example embodiments of the present disclosure are described hereinafter with reference to FIGS. 1 to 10.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, determining an optimal combination of products needed to be applied on a payment transaction, thereby resulting in high approval rates for the payment transaction, etc. The environment 100 generally includes a plurality of entities, for example, an acquirer server 102, a plurality of merchants 104a, 104b, and 104c, an issuer server 108, a product database 106, a payment network 114 including a payment server 116, and a transaction database 118 each coupled to, and in communication with (and/or with access to) a network 110. The network 110 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 110 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G), $5^{th}$ Generation (5G) communication protocols, Long Term Evolution (LTE) communication protocols, or any combination thereof. For example, the network 110 may include multiple different networks, such as a private network made accessible by the payment network 114 to the acquirer server 102 and the payment server 116, separately, and a public network (e.g., the Internet etc.).

The environment 100 also includes a server system 112 configured to perform one or more of the operations described herein. In one example, the server system 112 is embodied in the payment network 114. In general, the server system 112 is configured to predict or determine an optimal combination of products applying which, approval rates of payment transactions will get increased and fraud rates will be minimized. As mentioned previously, the products are configured to increase approval rates of the payment transactions. The server system 112 is a separate part of the environment 100, and may operate apart from (but still in communication with, for example, via the network 110) the acquirer server 102, the payment server 116, and any third party external servers (to access data to perform the various operations described herein). However, in other embodiments, the server system 112 may actually be incorporated, in whole or in part, into one or more parts of the environment 100, for example, the payment server 116. In addition, the server system 112 should be understood to be embodied in at least one computing device in communication with the network 110, which may be specifically configured, via executable instructions, to perform steps as described herein, and/or embodied in at least one non-transitory computer-readable media.

In one embodiment, the acquirer server 102 is associated with a financial institution (e.g., a bank) that processes financial transactions. This can be an institution that facilitates the processing of payment transactions for physical stores, merchants, or an institution that owns platforms that make online purchases or purchases made via software applications possible (e.g., shopping cart platform providers and in-app payment processing providers). The terms "acquirer", "acquirer bank", "acquiring bank" or "acquirer server" will be used interchangeably herein.

In one embodiment, a plurality of merchants 104a, 104b, and 104c is associated with the acquirer server 102. The plurality of merchants 104a, 104b, and 104c hereinafter is collectively represented as "merchant 104".

A cardholder 120 may operate a user device 122 to conduct an online payment transaction through a payment gateway application. Examples of the user device 122 include, but are not limited to, a personal computer (PC), a mobile phone, a tablet device, a Personal Digital Assistant (PDA), a voice activated assistant, a Virtual Reality (VR) device, a smartphone and a laptop. The cardholder 120 may be any individual, representative of a corporate entity, non-profit organization, or any other person. In one example, while performing a card-not-present (CNP) transaction, the cardholder 120 enters the payment card information associated with a payment card 124 into a web browser and submits the payment card information to the merchant 104. In one exemplary scenario, the merchant 104 may store the payment card information in a database and/or a server for performing card-on-file payment transaction (i.e., an example of the CNP transaction). In other words, the cardholder 120 authorizes the merchant 104 to store the card details of the cardholder 120 and to bill the cardholder 120 for recurring transactions using the stored card details.

The payment card information may include, but not limited to, the cardholder's name as it appears on the payment card 124, a billing address, an account number or card number of the payment card 124, and/or an expiration date of the payment card. The merchant 104 sends a payment authorization request to the acquirer server 102 that sends the request to the server system 112 or the payment server 116 for routing the payment transaction to the issuer 108 associated with the cardholder 120. The payment authorization request includes a plurality of data elements. The plurality of data elements may include, but is not limited to, BIN (bank identification number) of the issuer 108 of the payment card 124, a payment transaction identifier, a payment transaction amount, a payment transaction date/time, a CNP transaction flag, a merchant name and location, an acquirer identifier etc.

The cardholder 120 may have a payment account issued by an issuing bank (associated with the issuer server 108) and may be provided the payment card with financial or other account information encoded onto the payment card such that the cardholder 120 may use the payment card 124 to initiate and complete a transaction using a bank account at the issuing bank. The terms "issuer", "issuer bank", "issuing bank" or "issuer server" will be used interchangeably herein.

The issuer server 108 is a computing server that is associated with the issuer bank. The issuer bank is a financial institution that manages accounts of multiple cardholders. Account details of the accounts established with the issuer bank are stored in cardholder profiles of the cardholders in a memory of the issuer server 108 or on a cloud server associated with the issuer server 108. On receipt of the payment authorization request, the issuer 108 checks cardholder's identity and may also undertake other checks (e.g., fraud checking). Based on the checks, the issuer 108 may approve/decline the payment transaction and generate a payment authorization response.

In one embodiment, the format of the payment authorization request and authorization response messages are based on the ISO standard 8583, which is a standard for systems that exchange electronic transaction information associated with payments made by users using the payment card, or the payment account. This standard specifies the data format of the messages, and has a strictly defined set of data elements.

In one example, an ISO 8583 transaction message may include one or more data elements usable by the server system 112 or the payment server 116 to communicate information such as authorization requests, authorization responses, inquiries, indications of fraud, security information, or the like. For example, the ISO 8583 message may include a primary account number (PAN) in the second data field (also known as DE2), an amount of a transaction in DE4, date of settlement in DE15. In another example, the ISO 8583 message may include a response code DE60 used to indicate approval or decline of a payment transaction and a CNP transaction flag DE61 for indicating card-not-present transaction state. In the event an authorization response is declined, the response code DE60 indicates the reason for the rejection. The value for the response code will be generated by the local acquirer during the CNP authorization response.

To improve the authorization decision making of the payment transactions, the issuer 108 and/or the merchant 104 may utilize a number of authorizing components (i.e., services and products) offered by Mastercard® or any other third parties that may also be useful in connection with one or more embodiments of the present disclosure. Examples of the authorizing components are, but not limited to, decision intelligence (DI), Mastercard Digital Enablement Service (MDES), Automatic Billing Updater (ABU), Stand-In (SI), fraud rules manager (FRM), 3D Secure (3DS), etc.

The issuers and/or merchants may apply available authorizing components to payment transactions for improving authorization decision of the payment transactions. Since there is a wide variety of authorizing components available, it is difficult for the issuers and/or merchants to predict beforehand which authorizing components would likely decrease the decline rates (i.e., improve the approval rates). Further, each authorizing component may handle payment authorization requests of a particular transaction type. Thus, it is required that the issuers and/or merchants know which all authorizing components to apply at each transaction level so that the approval rate is maximized and a fraud rate are minimized.

To overcome the above limitations, the server system 112 is configured to identify an optimal combination of authorizing components (i.e., products) to be applied to each payment transaction (i.e., CNP/e-commerce payment transaction), proactively. In particular, the server system 112 is configured to predict the optimal combination of authorizing components (i.e., products) for each payment transaction by utilizing a deep reinforcement learning model and provide a product recommendation strategy to the issuers and/or merchants in near real-time.

In one embodiment, the transaction database 118 is a central repository of data which is created by storing payment transaction data from transactions occurring within acquirers and issuers associated with the payment network 114. The transaction database 118 stores real-time payment transaction data of a plurality of merchants. The payment transaction data may include, but not limited to, payment transaction attributes, such as, transaction identifier, merchant name, merchant identifier, merchant category code (MCC), cross-border transaction flag, payment card type (debit/credit/prepaid), card product type, transaction channel (such as, e-commerce, recurring, POS), card-not-present (CNP) transaction flag, response code flag (approve/decline), decline reason code (in case of declined transaction). In one embodiment, the transaction database 118 may also store a product flag vector along with each payment transaction. The product flag vector indicates which authorizing components (i.e., products) were applied to each payment transaction by the issuers/merchants.

In one embodiment, the product database 106 is configured to store information of all available authorizing components. In other words, the product database 106 stores software algorithms associated each authorizing component and a cost of applying each authorizing component to a payment transaction.

The server system 112 is configured to provide a product recommendation strategy to the issuer 108 along with the payment authorization request. The product recommendation strategy includes information of optimal authorizing components that are needed to be applied to the payment transaction associated with the payment authorization request for enhancing authorization decision.

In one embodiment, the payment network 114 may be used by the payment cards issuing authorities as a payment interchange network. The payment network 114 may include a plurality of payment servers such as, the payment server 116. Examples of payment interchange network include, but are not limited to, Mastercard® payment system interchange network. The Mastercard® payment system interchange network is a proprietary communications standard promulgated by Mastercard International Incorporated® for the exchange of financial transactions among a plurality of financial activities that are members of Mastercard International Incorporated®. (Mastercard is a registered trademark of Mastercard International Incorporated located in Purchase, N.Y.).

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
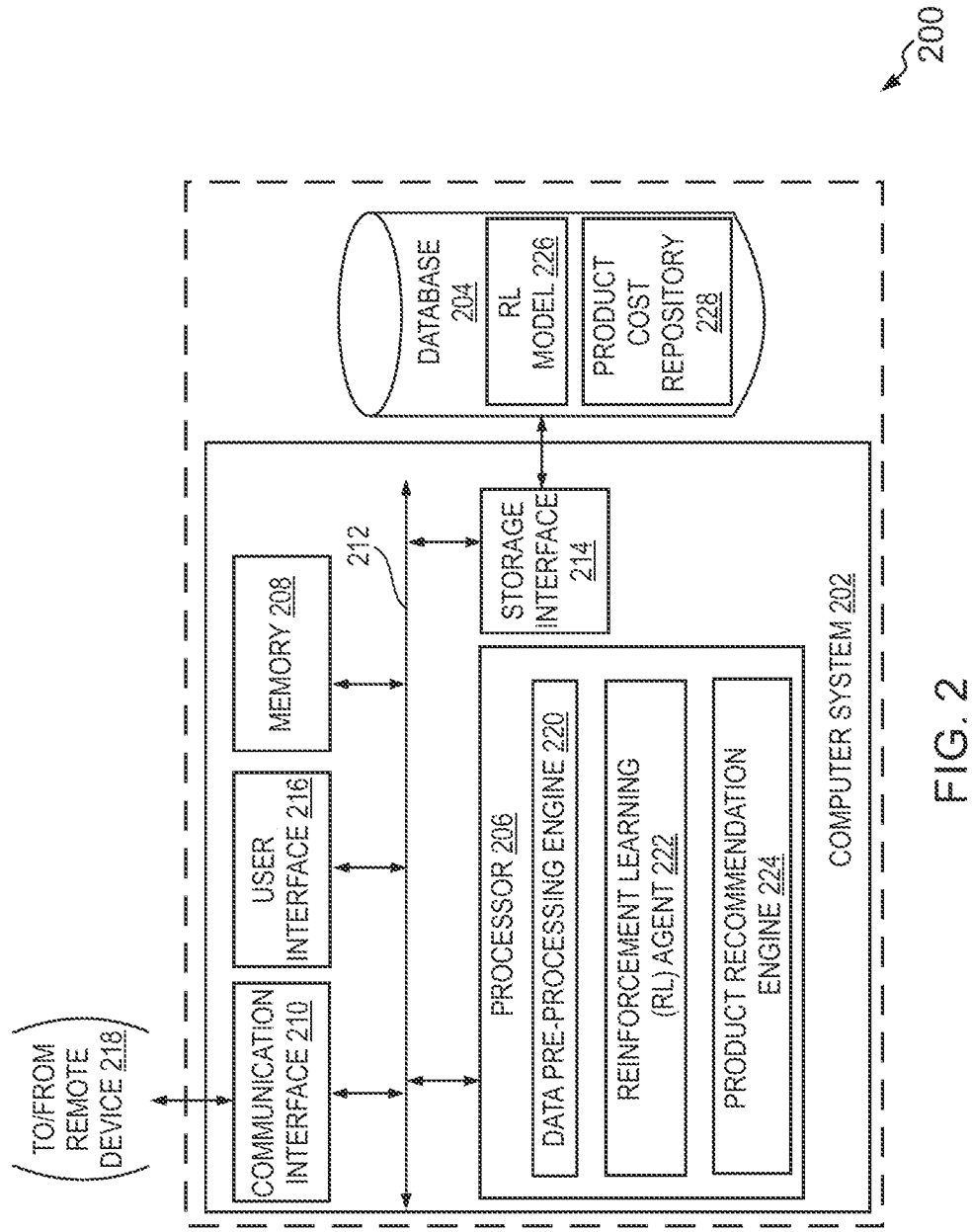
FIG. 2 is a simplified block diagram of a server system, in accordance with one embodiment of the present disclosure.

FIG. 2 is a simplified block diagram of a server system 200, in accordance with an embodiment of the present disclosure. The server system 200 is similar to the server system 112. In some embodiments, the server system 200 is embodied as a cloud-based and/or SaaS-based (software as a service) architecture. In one embodiment, the server system 200 is a part of the payment network 114 or is integrated within the payment server 116. In another embodiment, the server system 200 is embodied within the issuer server 108.

The server system 200 includes a computer system 202 and a database 204. The computer system 202 includes at least one processor 206 for executing instructions, a memory 208, a communication interface 210, and a user interface 216 that communicate with each other via a bus 212.

In some embodiments, the database 204 is integrated within computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204. In one embodiment, the database 204 is configured to store a trained reinforcement machine (RL) learning model 226 and a product cost repository 228.

Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or a cloud storage working in conjunction with the server system 200, without departing from the scope of the present disclosure.

The processor 206 is operatively coupled to the communication interface 210 such that the processor 206 is capable of communicating with a remote device 218 such as, the merchant 104, or communicated with any entity connected to the network 110 (as shown in FIG. 1). Further, the processor 206 is operatively coupled to the user interface 216 for interacting with the merchant 104 to recommend the most optimal combination of authorizing components in real-time which are to be applied over a particular transaction type, resulting in enhanced approval rates and reduced decline rates of payment transactions.

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a data pre-processing engine 220, a reinforcement learning (RL) agent 222, and a product recommendation engine 224. It should be noted that the components, described herein, can be configured in a variety of ways, including electronic circuitries, digital arithmetic and logic blocks, and memory systems in combination with software, firmware, and embedded technologies.

The data pre-processing engine 220 includes suitable logic and/or interfaces for receiving real-time payment transaction request (i.e., payment authorization request) for a payment transaction between the cardholder 120 and the merchant 104. In one embodiment, the payment transaction is a card-not-present payment transaction. For instance, a cardholder 'A' purchases a product by accessing a merchant website 'XYZ.com'. On payment interface, the cardholder 'A' enters card details (such as, card number, cardholder's name, card expiration date, CVV) of the payment card and then the merchant sends a payment transaction request to an acquirer who sends a payment authorization request to an issuer associated with the cardholder based on the card details.

The data pre-processing engine 220 is configured to extract payment transaction features from various data elements of the payment authorization request. In one example, the payment authorization request is formatted by the acquirer server 102 to make it compliant with the ISO 8583 message. The payment transaction features may include, but not limited to, issuer identifier, acquirer identifier, merchant category code (MCC), merchant identifier, cross-border transaction flag, payment card type (e.g., debit card, credit card, prepaid card, etc.), card product type, etc.

In one embodiment, the data pre-processing engine 220 is configured to randomly select all past transaction-level data (i.e., payment authorization request and payment authorization response messages of past payment transactions) associated with the issuer 108 and/or the merchant 104, for training the RL agent 222. The past transaction-level data associated with the issuer 108 and/or the merchant 104 is stored in the transaction database 118. In other words, the data pre-processing engine 220 is configured to access historical transactions and authorizing components (i.e., products) which were applied by the issuer 108 or the merchant 104 while processing a particular payment transaction. The transaction-level data associated with the issuer 108 or the merchant 104 includes a number of declined/approved/fraud transactions such that the RL agent 222 learns the apt representation of the transaction-level data associated with the issuer 108 or the merchant 104.

In one embodiment, the data pre-processing engine 220 is configured to filter the past transaction-level data with some data constraints (such as, transaction type: card-not-present, decline reason code: addressable declines, issuer and/or merchant geographical region: for example, USA). More specifically, the past transaction-level data must have following values corresponding to various data fields:

TABLE 1

| Data Element (DE) | Value | Description |
| --- | --- | --- |
| DE61, Subfield 5 | 1 | Payment transaction is CNP type. |
| DE61, Subfield 7 | 0 | Normal Transactions |
| DE61 | 4 | Pre-authorized Request |

In one embodiment, the decline reason code associated with a particular payment transaction must be addressable declines (i.e., which can be handled by available authorizing components). In one non-limiting example, the addressable decline reason code may contain values such as '04', '14', '41', '41', '43', '54', '57', '61', '62', '65', '76', '77', '78', '81', '91', etc.

Thereafter, the data pre-processing engine 220 is configured to aggregate the filtered past transaction-level data according to specific data elements for obtaining payment transaction attributes. The specific data elements include, but are not limited to, such as, issuer name/identifier, cross-border transaction flag, merchant category code (MCC), super industry, month of payment transaction, payment card type, card product type, product flag vector etc. The product flag vector for a particular payment transaction indicates possible authorizing components (i.e., products) that were enabled on the particular payment transaction. In one example, the product flag vectors for two different transactions can be represented in the following ways:

TABLE 2

| Transaction | Product_1 | Product_2 | Product_3 | Product_4 |
|---|---|---|---|---|
| $T_1$ | 1 | 0 | 1 | 0 |
| $T_2$ | 0 | 0 | 0 | 1 |

As shown in the table 2, the issuer 108 has applied Product 1 and Product 3 over the payment transaction $T_1$, and the Product 4 over the payment transaction $T_2$.

The RL agent 222 includes suitable logic and/or interfaces for predicting a combination of one or more authorizing components (i.e., products) to be applied to the payment transaction. The RL agent 222 implements a machine learning model (for example, a deep reinforcement learning model). The RL agent 222 is trained using the payment transaction attributes associated with the past payment transactions with declined/approved authorization responses.

Figure 4:
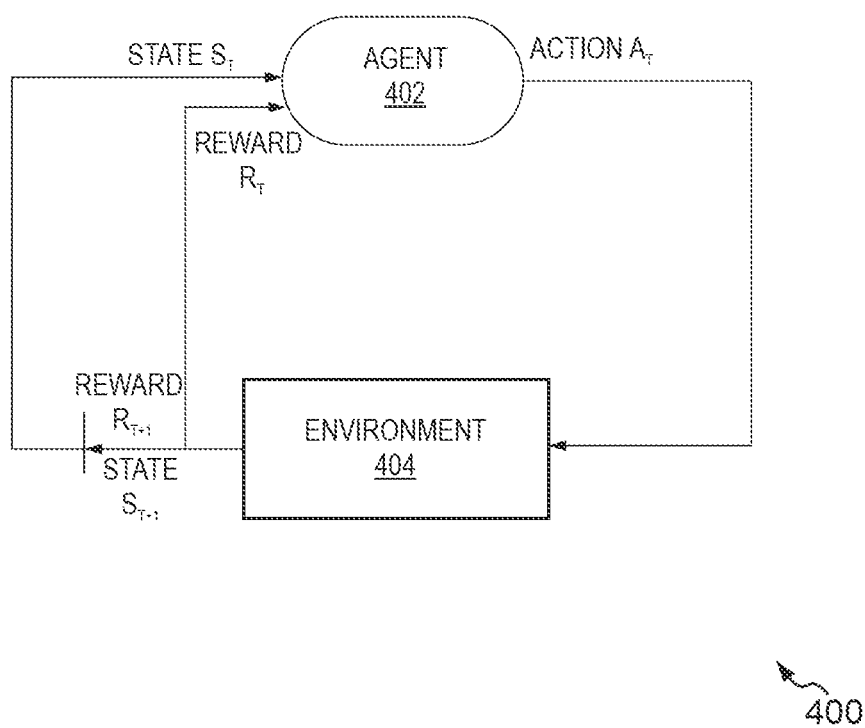
FIG. 4 is a block diagram representation of a deep reinforcement learning model, in accordance with an example embodiment of the present disclosure.

In order to express the use of reinforcement learning in the product recommendation system for enhancing approval rates of the payment transaction more clearly, the present disclosure explains theoretical models of deep reinforcement learning model, the Markov Decision Process (MDP) with reference to FIG. 4 in more detail. It would be apparent to those skilled in the art that several of deep reinforcement learning models may be applied to accomplish the spirit of the present disclosure.

During the training process, the RL agent 222 is configured to define state space and action space of the deep reinforcement learning model. The state space represents the payment transaction attributes associated with a payment transaction and authorizing components applied to the payment transaction.

The action space represents the application of an additional product to the payment transaction. More specifically, a state refers a type of payment transaction and product flag vectors, and an action refers to applying the additional product to the payment payment transaction. The RL agent 222 is configured to initialize Q-value function and learn the best optimal path for a particular type of payment transaction based on a reward function. The reward function depends upon approval and fraud probability scores of the particular type of transaction and the cost of applying authorizing components to the particular type of transaction. In one embodiment, the approval and fraud probability scores of the particular type of transaction are determined based on historical transaction data (i.e., a number of processed transactions that were approved or declined due to fraud). In one embodiment, the cost of applying an authorizing component is a transaction-level cost and stored at the product cost repository 228.

Once, the RL agent 222 is trained based on the payment transaction attributes associated with the historical transaction data, the RL agent 222 can predict what authorizing components (i.e., products) should be applied to a particular payment transaction in real-time. Further, the RL agent 222 is configured to learn continuously the most optimal path for each payment transaction type as more and more transactions are processed by the issuer 108 and/or merchant 104.

The product recommendation engine 224 includes suitable logic and/or interfaces for transmitting payment authorization request and the product recommendation strategy to the issuer 108 in real-time. The issuer 108 applies one or more authorizing components included in the product recommendation strategy to the payment transaction, resulting in high approval rates, low fraud risks, and maximized revenues for issuers and/or merchants.

Figure 3:
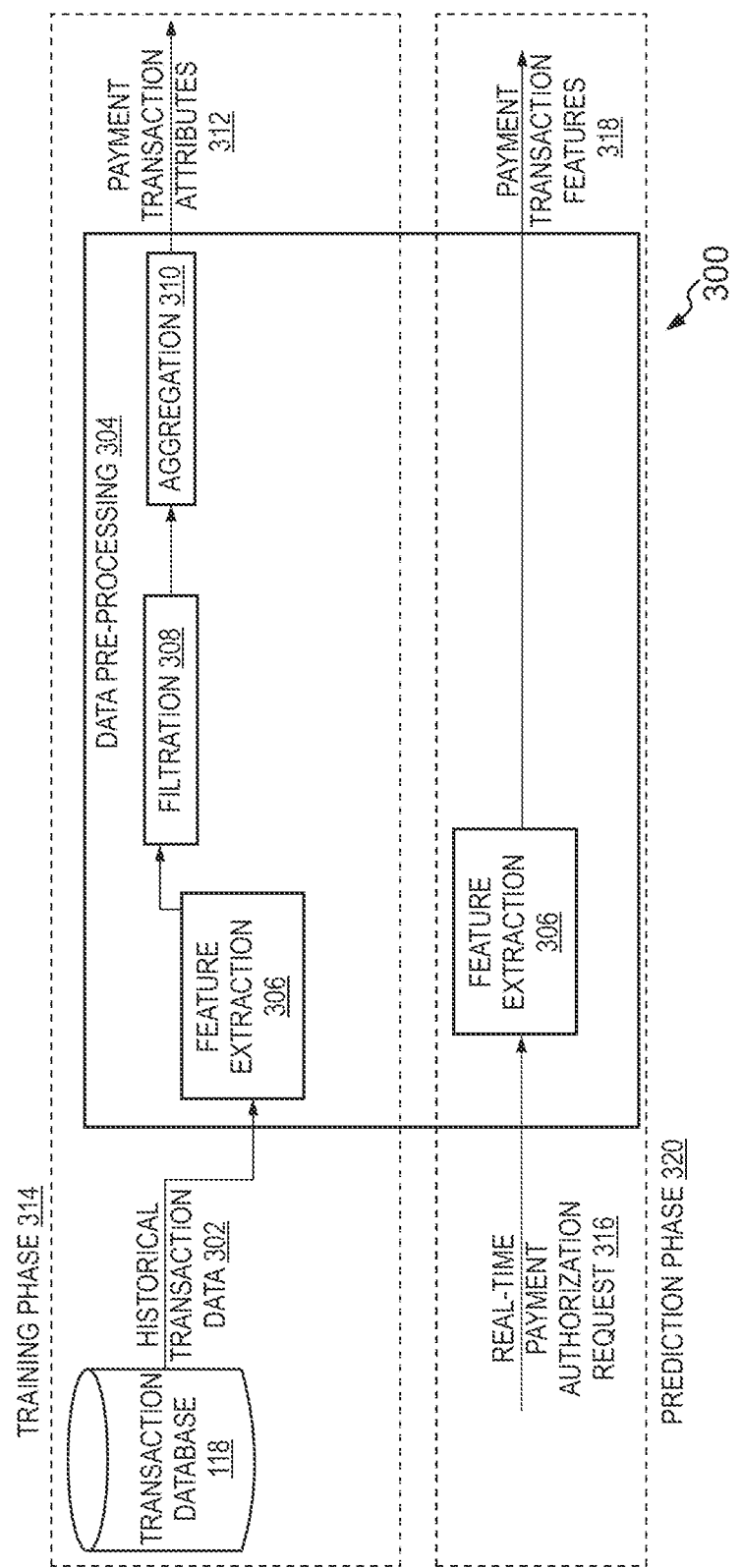
FIG. 3 is a schematic block diagram representation of data pre-processing process during training and prediction phases, in accordance with an example embodiment of the present disclosure.

FIG. 3 is a schematic block diagram representation 300 of data pre-processing process (see, 304) during training and prediction phases, in accordance with an example embodiment of the present disclosure.

During the training phase (see, 314), the processor 206 is configured to access historical transaction data (see, 302) associated with the issuer 108 and/or the merchant 104 from the transaction database 118. The historical transaction data include, but is not limited to, past payment transactions (including authorization requests and authorization response details of the number of past payment transactions) of the issuer 108 for a particular time duration. In particular, the processor 206 is configured to extract various data elements (i.e., features) present in each payment transaction from the transaction-level data and perform data sanitization process (see, 306). The various data elements may include, but not limited to, transaction identifier, issuer name/identifier, merchant name/identifier, acquirer name/identifier, cross-border transaction flag (e.g., cross border, domestic), transaction channel flag (e.g., e-commerce, POS, recurring payments), payment card type (e.g., credit, debit), card product type (customer/commercial), card-not-present (CNP) transaction flag, response code flag (approve/decline), decline reason code (in case of declined transaction), etc. The various data elements are called as payment transaction attributes. Further, the historical transaction data also includes a product vector associated with each payment transaction that indicates what authorizing components (i.e., products) were applied to each payment transaction by the issuer 108 while performing the payment transaction.

Further, the processor 206 is configured to filter-out transaction-level data of the past payment transactions for aggregation that have card-not-present (CNP) transaction flag indicating card-not-present transaction (see, filtration 308). The processor 206 is further configured to filter-out the transaction-level data of the past payment transactions which have a decline reason code indicating addressable declines (in a scenario, the payment transaction was declined). Thereafter, the processor 206 is configured to aggregate the filtered transaction-level data of the past payment transactions (see, 310) and provide the payment transaction attributes 312 and a product flag vector associated with each of the filtered past payment transactions to the deep reinforcement learning model for training.

During the prediction phase (see, 320), the processor 206 is configured to receive a real-time payment authorization request 316 for a payment transaction between the cardholder 120 and the merchant 104. The processor 206 is configured to extract payment transaction features 318 of the payment transaction from various data elements of the real-time payment authorization request (see, 306). The payment transaction features 318 may include, but not limited to, an issuer name, an issuer identifier, a merchant category code (MCC), a card product type (e.g., debit card, credit card), a cross border transaction flag, a card-not-present (CNP) transaction flag, etc.

FIG. 4 is a block diagram representation of a deep reinforcement learning model 400, in accordance with an embodiment of the present disclosure. As shown in the FIG. 4, the deep reinforcement learning model involves two entities, i.e., an agent 402 (similar to the RL agent 222) and an environment 404, that interacts with each other. The agent 402 is an entity that makes product recommendation decisions, and the environment 404 may be set to feedback a reward value depending upon approval probability and fraud probability scores of a particular transaction and a cost associated with applying a combination of products to the particular transaction. The deep reinforcement learning model 400 implements Markov Decision Process (MDP). The MDP may be represented by a four-tuple <S, A, R, T>, where, 1) S is a State Space, which includes a set of environmental states that the agent 402 may perceive.
2) A is an Action Space, which includes a set of actions that the agent 402 may take on each state of the environment 404.
3) R is a reward function and R(s, a, s') represents a reward that the agent 402 obtains from the environment 404 when the action 'a' is performed on the state s and the state is changed to state s'.
4) T is a state transition function and T(s, a, s') may represent a probability of executing action 'a' on state 's' and moving to state s'.

In the process of interaction between the agent 402 and the environment 404 in the MDP, the agent 402 senses that the environment state at time t is '$s_t$'. Based on the environment state '$s_t$', the agent 402 may select an action '$a_t$' from the action space A to execute. After the environment 404 receives the action selected by the agent 402, it returns corresponding reward signal feedback $R_{t+1}$ to the agent 402 and transfers to new environment state '$s_{t+1}$', and waits for the agent 402 to make a new decision. In the process of interacting with the environment 404, the goal of the agent 402 is to find an optimal strategy such that the optimal strategy obtains the largest long-term cumulative reward in any state 's' and any time step t.

The total reward is also called as Q-value denoted using the following equation:

$$Q(s,a)=r(s,a)+\gamma\max Q(s',a) \quad \text{Eqn. (1)}$$

The above equation states that the Q-value yielded from being at state 's' and performing action 'a' is equal to the immediate reward r(s, a) plus the highest Q-value possible from the next state s', and Gamma (γ) is a discount factor which controls the contribution of rewards further in the future. In other words, the Q(s, a) is a cumulative reward value of rewards generated in the subsequent learning optimization when the agent 402 executes the action 'a' in the state 's'.

Further, in the deep reinforcement learning model 400, a neural network architecture is utilized to approximate Q value-function. The state is given as the input and the Q-values of all possible actions are generated as the output.

Based on the above deep reinforcement learning model 400, the server system 200 provided by the present disclosure predicts a combination of one or more products to be applied to the payment transaction according to a product recommendation strategy, to improve approval rates of the payment transaction. Then the server system 200 iteratively updates the product recommendation strategy by using the deep reinforcement learning model 400 according to the issuer/merchant's future transaction data, to finally learn the optimal product recommendation strategy step by step.

Figure 5A:
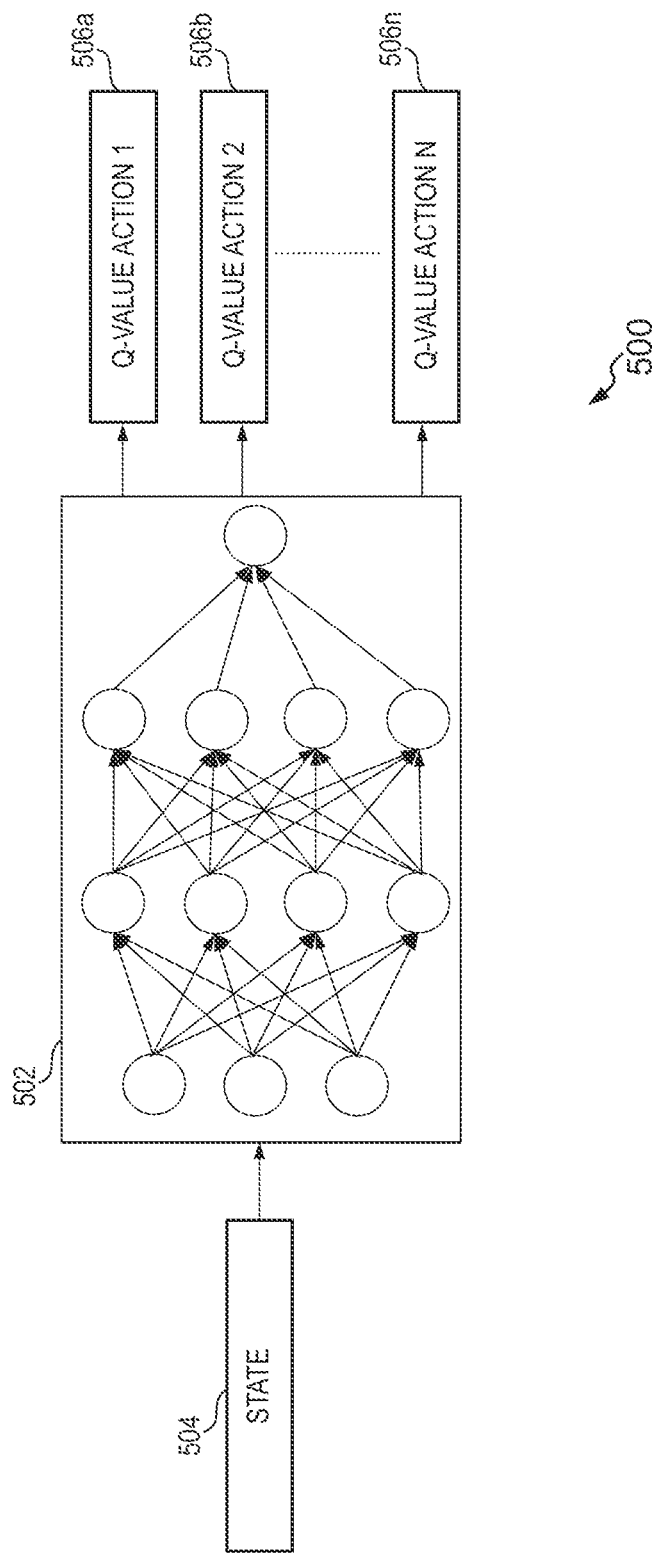
FIG. 5A is a block diagram representation of a neural network architecture of the deep reinforcement learning model, in accordance with an example embodiment of the present disclosure.

FIG. 5A is a block diagram representation of a neural network architecture of a deep reinforcement learning model 500, in accordance with an embodiment of the present disclosure.

As mentioned above, in reinforcement learning, in the process of interacting with the environment, the goal of the agent 402 is to find an optimal strategy such that the agent 402 receives the maximum long-term cumulative reward in any state s and any time step t. In some example embodiments, the above objective may be achieved using a Q-value function approximation algorithm. In other example embodiments, the foregoing objectives may also be implemented by using other reinforcement learning algorithms such as a strategy approximation algorithm, which is not limited herein.

In one embodiment, the deep reinforcement learning model 500 may include one or more neural networks. In one embodiment, the neural network 502 includes an input layer, multiple hidden layers, and an output layer. The neural network 502 is utilized to approximate the Q-value function. The MDP in the deep reinforcement learning model includes a state space S and an action space A, wherein the payment transaction attributes and product flag vectors correspond to the state space S, and application of one or more authorizing components (i.e., products) over a payment transaction corresponds to the action space A.

The input to the neural network 502 is a state 504 which includes a product flag vector and payment transaction attributes (i.e., features) associated with the payment transaction. Further, the state may also be defined based on card product name (Standard, elite, gold customers), product group name, product code, merchant category code (MCC) represented in form of one-dimensional vector, cardholder type transaction, card-on-file indicator for the payment transaction. An example representation of a state for two different payment transactions is shown in the following table 3, in accordance with an example embodiment:

TABLE 3

| Product_1 | Product_2 | Product_3 | Product_4 | Product flag vector | Cross-Border | Card type | Industry Code Vector |
|---|---|---|---|---|---|---|---|
| 0 | 0 | 0 | 1 | [0001] | 1 | 0 | [01000] |
| 0 | 0 | 1 | 0 | [0010] | 0 | 1 | [00010] |

In an example as shown in first row, the payment transaction features for a first payment transaction are cross-border, debit card, industry. An authorizing component is applied over the first payment transaction "Product_4" at a time, therefore, a product flag vector of the first payment transaction is 0001. Thus, payment transaction features and product information define a current state of the first payment transaction. The current state will get changed when the issuer 108 applies another authorizing component to the first payment transaction. In another example in the second row, the payment transaction features for a second payment transaction are domestic, credit card, industry. The product flag vector for the second payment transaction is 0010. Further, the industry code vector is a vector representation, where each index value refers to a particular industry type. In the first row, the industry code vector is 01000.

The output of the neural network 502 represents predicted Q-values (i.e., Q value-action 1 506a, Q value-action 2 506b . . . Q value-action n 506n) for each state-action pair. The action represents an application of one or more authorizing components to a payment transaction. The loss function is the mean squared error of the predicted Q-value and the target Q-value. To the extent the predicted Q value from the neural network 502 differs from the target Q-value, various training techniques, (such as, back propagation, stochastic gradient descent, etc.,) may be employed to adjust various weights associated with the neural network 502 to reduce the loss function.

Thus, the processor 206 is configured to determine the current state and according to a certain strategy, outputs the corresponding action 'a'. The server system 200 may provide the recommended authorizing components to issuers according to a certain recommendation strategy.

Figure 5B:
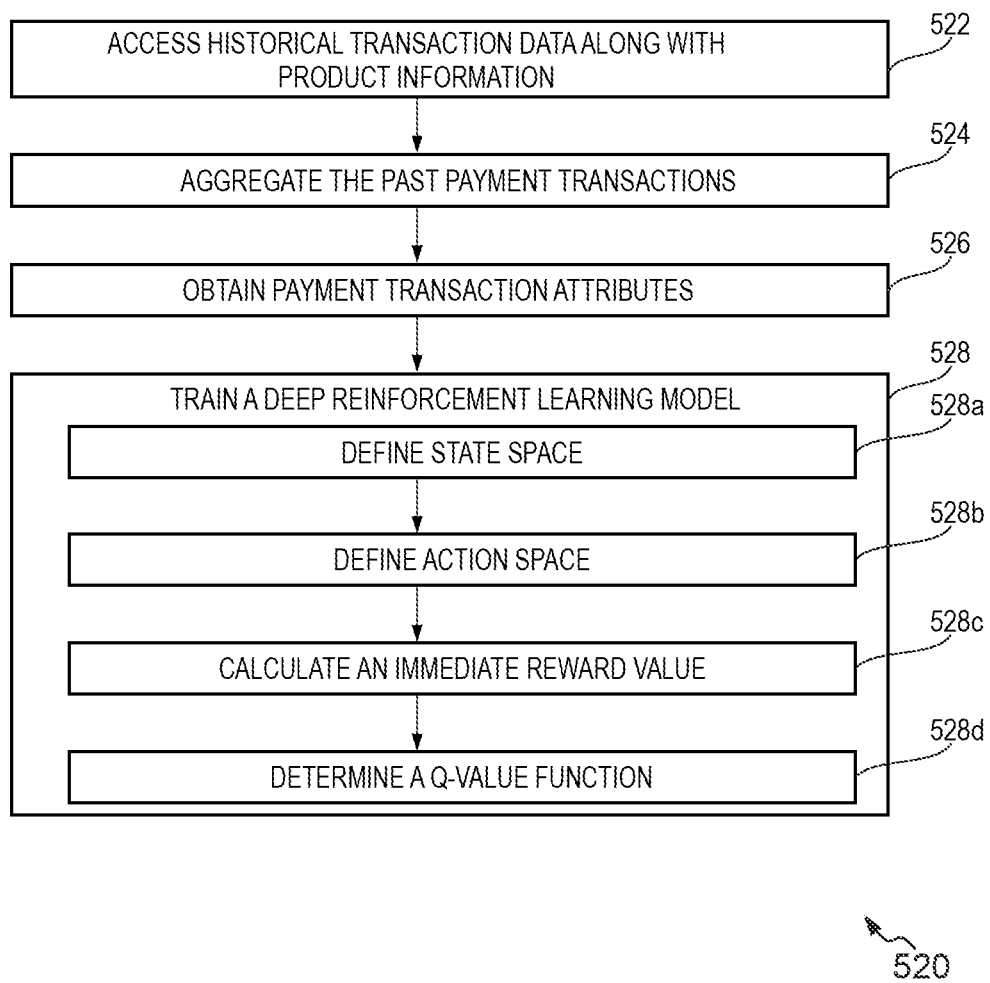
FIG. 5B is a flow chart for training the deep reinforcement learning model, in accordance with an example embodiment of the present disclosure.

FIG. 5B represents a flow chart 520 for training the deep reinforcement learning model 500, in accordance with an embodiment of the present disclosure. The sequence of operations of the flow chart 520 may not be necessarily executed in the same order as they are presented. Further, one or more operations may be grouped and performed in the form of a single step, or one operation may have several sub-steps that may be performed in parallel or in a sequential manner.

At 522, the server system 200 accesses historical transaction data associated with the issuer 108 and/or merchant 104. The historical transaction data includes transaction-level data of past payment transaction requests and authorizing component information which were applied to each payment transaction request of the past payment transaction requests. As mentioned above, one or more authorizing components are configured to reduce the decline rates of payment transactions.

At 524, the server system 200 aggregates the past payment transaction requests according to specific data elements. The specific data elements include, but are not limited to, such as, issuer name/identifier, cross border transaction flag, merchant category code (MCC), super industry, month of payment transaction, payment card type, card product type, product flag vector etc. The product flag vector for a particular payment transaction indicates authorizing components (i.e., products) that were enabled on the applied to the particular payment transaction.

At 526, the server system 200 obtains payment transaction attributes based on the aggregated past payment transaction requests. The payment transaction attributes include, but are not limited to, information such as, issuer name/identifier, cross border transaction flag, merchant category code (MCC), super industry, month of payment transaction, payment card type, card product type, product flag vector, etc.

At 528, the server system 200 trains the deep reinforcement learning model based, at least, on the payment transaction attributes and authorizing components (i.e., products) applied to the past payment transaction requests by the issuer 108. The training of the deep reinforcement learning model is performed at steps 528a-528d.

At 528a, the server system 200 defines state space of the deep reinforcement learning model. The state space may include a plurality of states. Each state corresponds to a particular transaction type (i.e., payment transaction attributes) and a product flag vector. The product flag vector indicates the application of authorizing components over a payment transaction by the issuer 108 or the merchant 104.

At 528b, the server system 200 defines an action space of the deep reinforcement learning model. The action space includes a plurality of actions. Each action corresponds to applying an authorizing component to a payment transaction. It should be noted that the action space corresponding to the action 'a' is not the application of the all authorizing components to the payment transaction available at the issuer 108. In order to further reduce the dimension of the action space and improve the processing efficiency, the action space corresponding to the action 'a' is set as a limited candidate product space. The candidate authorizing component space may be obtained based on the particular transaction type, the characteristics of the authorizing components, and the like, which is not limited herein.

After defining the state and action spaces, at 528c, the server system 200 calculates an immediate reward value that is obtained in any state based on a reward function. The immediate reward value for a state may be represented by the following formula:

$$r = \frac{p(\text{Approval})}{P(\text{fraud})} + \sum_{i=1}^{\text{Total number of authorizing components applied}} \frac{1}{\text{Cost}(p_i)} \quad \text{Eqn. (2)}$$

wherein 'r' represents a reward value of a state 's' after performing an action 'a', p(Approval) is a probability of approval of a particular transaction, p(fraud) is a probability of the particular transaction being fraud, and $\text{Cost}(p_i)$ is a cost incurred to the issuer on applying a product 'i' on the particular transaction. Since each authorizing component has a cost incurred to the issuer, this cost can be broken down on a transaction level and the addition of each authorizing component on a payment transaction comes with an associated cost. The cost information of each authorizing component is accessed from the database 204.

As shown in Eqn. (2), the first term of the reward function includes p(Approval) and p(fraud). The second term of the reward function is inversely proportional to a summation of total cost of all authorizing components that may be applied to the payment transaction.

In one embodiment, the p(Approval) and p(fraud) are determined based on the historical transaction data of the issuer 108. The p(Approval) denotes a likelihood of getting a payment transaction approved after applying a particular product by the issuer 108 (see, table 3). For determining the approval and fraud probability scores, the server system 200 is configured to analyze past payment transactions and determine the number of approved transactions and declined transactions due to fraud for each payment transaction type, from the past payment transactions. In one example as shown in the table 3, an approval probability for a payment transaction type (cross-border, credit card, merchant industry) without applying any product is 0.4. In another example, an approval probability for the payment transaction type (cross border, credit card, merchant industry) after applying a product (e.g., "3D Secure, 3DS") is 0.7. Similarly, fraud probability for a payment transaction type is also determined using existing fraud risk models.

TABLE 3

| ABU | MDES | 3DS | Cross-Border | Card Type | Industry | P(Approval) | P(fraud) |
|---|---|---|---|---|---|---|---|
| 0 | 0 | 0 | 1 | 0 | 1 | 0.3 | 0.6 |
| 0 | 0 | 1 | 1 | 1 | 1 | 0.7 | 0.4 |

Thus, the reward function is configured to increase in the approval probability and decrease in the fraud probability for a payment transaction. Further, the reward function also includes the cost of applying additional product to the payment transaction, thereby optimizing the path with maximum marginal gain for the issuer 108.

Additionally, the server system 200 calculates a cumulative reward value corresponding to the state-action pairs based on the Eqn. (1).

At 528d, the server system 200 determines the Q-value function which is approximated to an optimal Q-value using the neural network 502. In one embodiment, the Q-value function about state 's' and action 'a' is constructed based on a regression model which may include linear regression, tree regression, neural network, and other means.

Initially, the neural network coefficients of the neural network 502 may be initialized stochastically, or randomly. Based on the cumulative reward value, the neural network 502 can use the difference between its expected reward and the ground-truth reward to adjust its weights and improve its interpretation of state-action pairs.

The formula of the Q-value function may include:

$$Q(S_t, A_t) \leftarrow Q(S_t, A_t) + \alpha [R_{t+1} + \gamma \max_a Q(S_{t+1}, a) - Q(S_t, A_t)] \quad \text{Eqn. (3)}$$

Where $Q(S_t, A_t)$ represents the estimated cumulative reward value obtained by executing the action $A_t$ in the state $S_t$; $R_{t+1}$ represents the immediate reward value obtained in the next state $S_{t+1}$ after executing the action $A_t$ in the state $S_t$; $\max_a Q(S_{t+1}, a)$ represents the estimated optimal value that is obtained under state $S_{t+1}$; and $\alpha \varepsilon (0,1]$ represents the influence of estimation error, similar to stochastic gradient descent and finally converges to the optimal Q-value.

According to the definition of Eqn. (3), the Q-Learning valuation iteration is performed using past payment transactions as sample data. In particular, the Q-value for each of the payment transaction type may be updated. For example, the state definitions corresponding to a particular transaction type are denoted as $S_1$-$S_{10}$. The updated Q-values corresponding to each state are $Q_1$-$Q_{10}$. In one example, the state $S_1$ represents a payment transaction type (CNP transaction, domestic transaction, merchant industry) with no authorizing components applied. Then, immediate reward values obtained in the state $S_1$ after applying actions 1 ... 10 are calculated and a maximum reward value associated with an action is updated as an optimal Q value for the state $S_1$.

It should be noted that the value function used in the present disclosure is not limited to the state value function approximation algorithm (such as the Q-value function approximation algorithm described above), but may also include any reinforcement learning method that calculates the optimal action strategy in any state, such as a strategy approximation algorithm, which is not limited herein.

Figure 6:
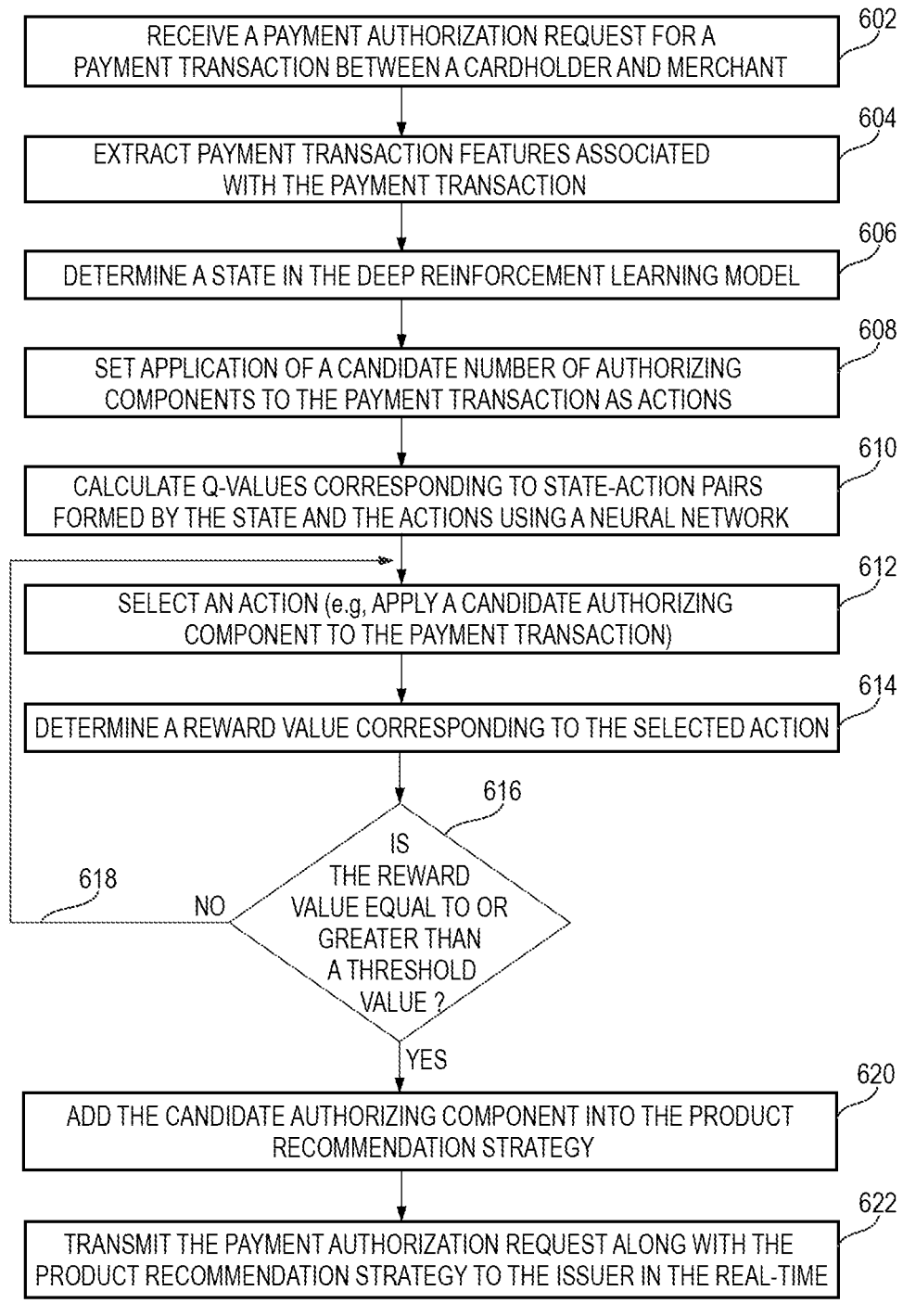
FIG. 6 is a flow chart for predicting a combination of one or more products to be applied to a particular payment transaction for enhancing approval rates using the deep reinforcement learning model, in accordance with an example embodiment of the present disclosure.

FIG. 6 represents a flow chart 600 for predicting a combination of one or more products to be applied to a particular payment transaction for enhancing approval rates using the deep reinforcement learning model, in accordance with an embodiment of the present disclosure. The sequence of operations of the flow chart 600 may not be necessarily executed in the same order as they are presented. Further, one or more operations may be grouped and performed in form of a single step, or one operation may have several sub-steps that may be performed in parallel or in a sequential manner.

At 602, the server system 200 receives a payment authorization request for a payment transaction (e.g., card-not-present) between a cardholder and a merchant 104.

At 604, the server system 200 extracts payment transaction features associated with the payment transaction from the payment authorization request.

At 606, the server system 200 sets or determines a current state in the deep reinforcement learning model based on the payment transaction features and associated product flag vector. After the neural network 502 is optimized, the state is fed into the neural network 502 of the deep reinforcement learning model 500 that provides all Q-values for all possible actions in the state.

At 608, the server system 200 sets the application of a candidate number of authorizing components to the payment transaction as actions in the deep reinforcement learning model.

At 610, the server system 200 calculates or estimates Q-values corresponding to state-action pairs formed by the state and the actions using the neural network 502. In other words, the Q-function estimation value of each candidate authorizing component is calculated through the neural network 502.

At 612, the server system 200 selects an action (e.g., apply a candidate authorizing component to the payment transaction) using epsilon greedy policy methods. In the epsilon greedy policy methods, the action is selected that has a maximum Q-value, such as, a=argmax(Q(s,a,w)). In other words, the server system 200 simulates the application of the candidate authorizing component to the payment transaction.

At 614, the server system 200 determines a reward value corresponding to the selected action (e.g., application of a candidate authorizing component to the payment transaction) based on a reward function (see Eqn. (2)). After performing the selected action, the deep reinforcement learning model 500 goes to a new state. In one embodiment, the action with the reward value in the action space satisfies the preset condition is added in the product recommendation strategy. The preset condition may include an action with the reward value greater than a threshold value or a preset number of actions with the top Q-value. For example, the action space is the application of one or more authorizing components (i.e., candidate authorizing components). The Q-function estimation values are arranged in descending order and the first two candidate authorizing components with the highest Q-function estimation values are presented as recommended authorizing components.

At 616, the server system 200 checks whether the reward value is greater than or equal to a threshold value or not.

At 618, when the reward value is greater than or equal to the threshold value, the server system 200 adds the candidate authorizing component into a product recommendation strategy.

At 620, when the reward value is not greater than the threshold value, the server system 200 selects another action (e.g., application of another candidate authorizing component to the payment transaction) that has a maximum Q-value from all Q-values for all possible actions in the new state.

At 622, the server system 200 transmits the payment authorization request along with the product recommendation strategy to the issuer in the real-time. The issuer 108 applies one or more authorizing components included in the product recommendation strategy to the payment transaction, resulting in high approval rates, lower fraud risk and maximized revenues for issuers and/or merchants.

Figure 7:
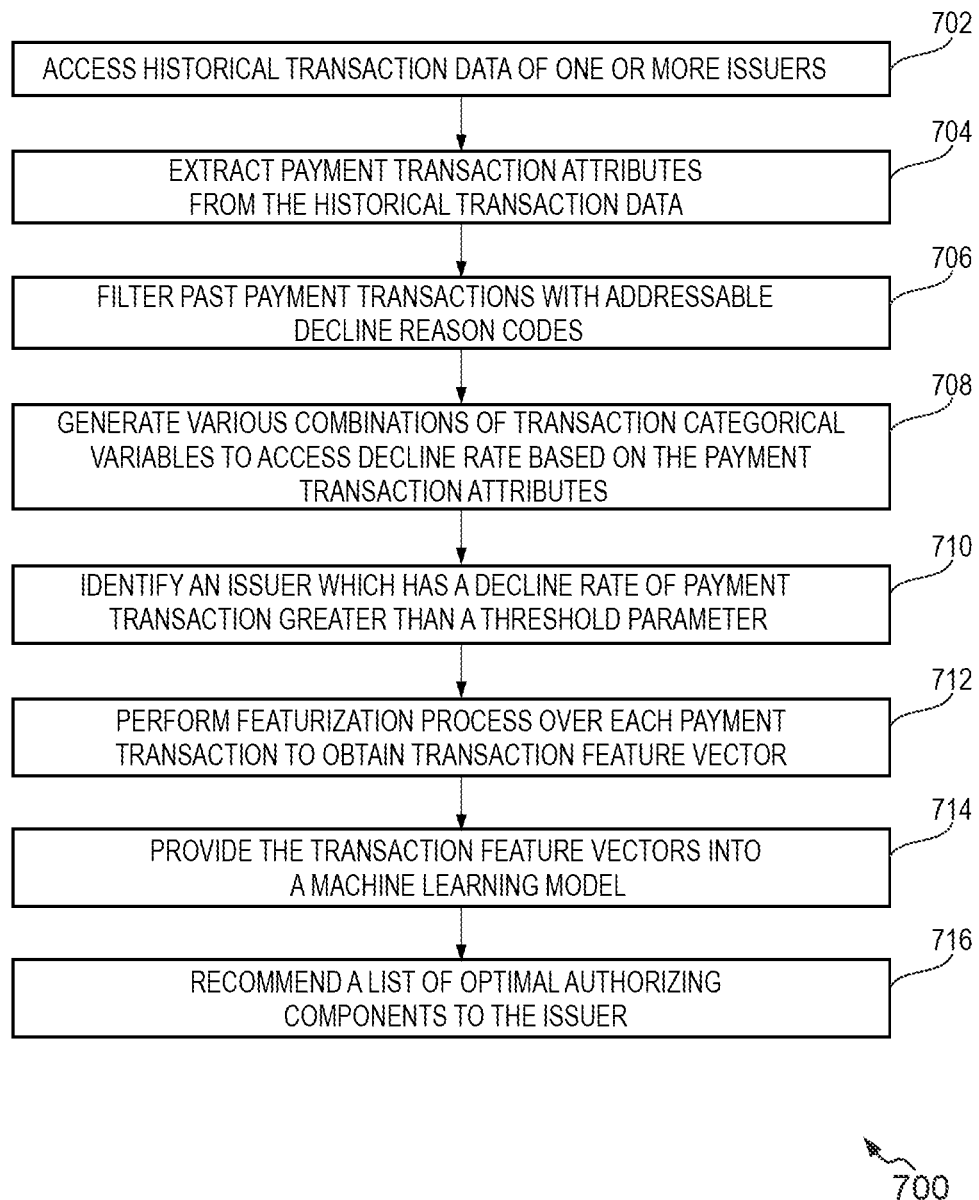
FIG. 7 is a sequence flow diagram for predicting a combination of one or more authorizing components to be applied to a particular payment transaction type (e.g., e-commerce transactions) for improving authorization rates, in accordance with an example embodiment of the present disclosure.

FIG. 7 represents a sequence flow diagram 700 for predicting a combination of one or more authorizing components to be applied to a particular payment transaction type (e.g., e-commerce transactions) for improving authorization rates, in accordance with an example embodiment of the present disclosure. The sequence of operations of the flow chart 700 may not be necessarily executed in the same order as they are presented. Further, one or more operations may be grouped and performed in form of a single step, or one operation may have several sub-steps that may be performed in parallel or in sequential manner.

At 702, the server system 200 accesses historical transaction data of one or more issuers. The historical transaction data of an issuer may include, but not limited to, past payment transactions (including authorization requests and authorization response details of the past payment transactions) for a particular time duration.

At 704, the server system 200 extracts payment transaction attributes from the historical transaction data. In particular, the server system 200 extracts various data elements present in each payment transaction from the historical transaction data and perform data sanitization process. The various data elements may include, but not limited to, transaction identifier, issuer identifier, issuer name, merchant name/identifier, acquirer name/identifier, cross-border transaction flag (e.g., cross border, domestic), transaction channel flag (e.g., e-commerce, POS, recurring payments), payment card type (e.g., credit, debit), card product type (customer/commercial), card-not-present (CNP) transaction flag, response code flag (approve/decline), decline reason code (in case of declined transaction), product flag vectors (indicating applied authorizing components by the issuers), etc.

At 706, the server system 200 filters the past payment transactions with decline reason codes which were addressable by available authorizing components (i.e., products). Since the available authorizing components may not handle all type of declined transactions, the past payment transactions of the one or more issuers are then filtered on these decline reason codes so that the server system 200 recommends authorizing components only on relevant payment transactions.

At 708, the server system 200 generates various combinations of transaction categorical variables (such as, issuer name, merchant name, acquirer name, cross-border transaction flag, card product type, transaction channel) to assess decline rates associated with the one or more issuers based on the payment transaction attributes. In particular, the server system 200 identifies decline rates of the payment transaction for each possible combination of transaction categorical variables and generates average decline rate for each possible combination of transaction categorical variables.

At 710, the server system 200 identifies an issuer from the one or more issuers that has a decline rate of payment transactions greater than a threshold parameter. In one example, assuming, an issuer X frequently declines payment transactions initiated from a merchant A considering them as fraudulent, where the payment transactions are card-not-present (CNP) and cross-border payment transaction type. These frequent declined payment transactions may cause merchants and payment networks in loss of revenue.

At 712, the server system 200 performs featurization process over each payment transaction and converts payment authorization data associated with each payment transaction into transaction feature vectors. In particular, the server system 200 transforms high cardinality features (such as, issuer name, merchant, acquirer) associated with the identified payment transaction into tenable features by mean encoding process. Further, the server system 200 converts each payment transaction variable (such as, cross border transaction flag, transaction channel, credit/debit card, commercial/customer card, card taxonomy, etc.) into one-hot encoded vector.

At 714, the server system 200 provides the transaction feature vectors into a machine learning model (e.g., a regression-based Gradient Boosted Tree (GBT) model) that predicts a likely decrease in decline rates for the issuer after applying authorizing components to the payment transactions. In one embodiment, the server system 200 simulates payment transaction data with all the available authorizing components (i.e., products) so that the server system 200 is able to predict what authorizing components should be applied to reduce decline rates for particular payment transaction features. The server system 200 finds the most optimal combinations of authorizing components for the particular payment transaction features using the machine learning model. The machine learning model is trained based on the past transaction data of the issuer along with product flag vectors that indicate what authorizing components were applied by the issuer previously for improving approval rates of the payment transactions.

At 716, the server system 200 recommends and transmits a list of optimal authorizing components to the issuer 108 for similar payment transactions with the particular payment transaction features, thereby improving approval rates of various type of payment transactions.

Figure 8:
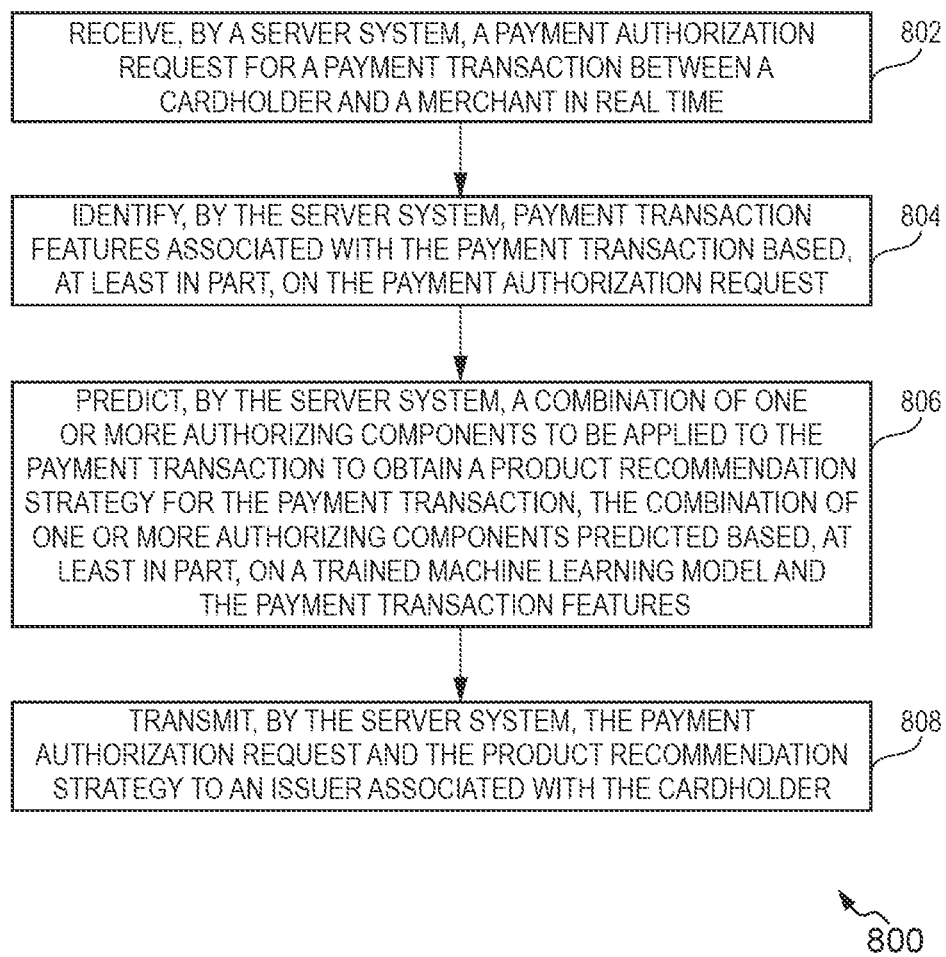
FIG. 8 is a flow diagram of a computer-implemented method for enhancing approval rates of payment transactions by providing a product recommendation strategy to an issuer, in accordance with an example embodiment of the present disclosure.

FIG. 8 is a flow diagram of a computer-implemented method 800 for enhancing approval rates of payment transactions by providing a product recommendation strategy to an issuer, in accordance with an example embodiment. The method 800 depicted in the flow diagram may be executed by the payment server 116 or the server system 112 as explained with reference to FIG. 1. Operations of the method 800, and combinations of operation in the method 800, may be implemented by, for example, hardware, firmware, a processor, circuitry and/or a different device associated with the execution of software that includes one or more computer program instructions. It is noted that the operations of the method 800 can be described and/or practiced by using a system other than the server systems. The method 800 starts at operation 802.

At the operation 802, the method 800 includes receiving a payment authorization request for a payment transaction between a cardholder 120 and a merchant 104 in real-time. In one embodiment, the payment transaction is card-not-present (CNP) payment transaction.

At operation 804, the method 800 includes identifying payment transaction features associated with the payment transaction based, at least in part, on the payment authorization request.

At operation 806, the method 800 includes predicting a combination of one or more authorizing components to be applied to the payment transaction to obtain a product recommendation strategy for the payment transaction. The combination of one or more authorizing components is predicted based, at least in part, on a trained machine learning model and the payment transaction features. In one embodiment, the trained machine learning model is a deep reinforcement learning model. The deep reinforcement learning model is trained based, at least in part, on historical transaction data associated with an issuer 108 within a particular time duration. The historical transaction data includes transaction-level data associated with past payment transactions and authorizing components applied by the issuer 108 to the past payment transactions.

At operation 808, the method 800 includes transmitting the payment authorization request and the product recommendation strategy to the issuer 108 associated with the cardholder 120.

The sequence of operations of the method 800 need not to be necessarily executed in the same order as they are presented. Further, one or more operations may be grouped together and performed in form of a single step, or one operation may have several sub-steps that may be performed in parallel or in sequential manner.

Figure 9:
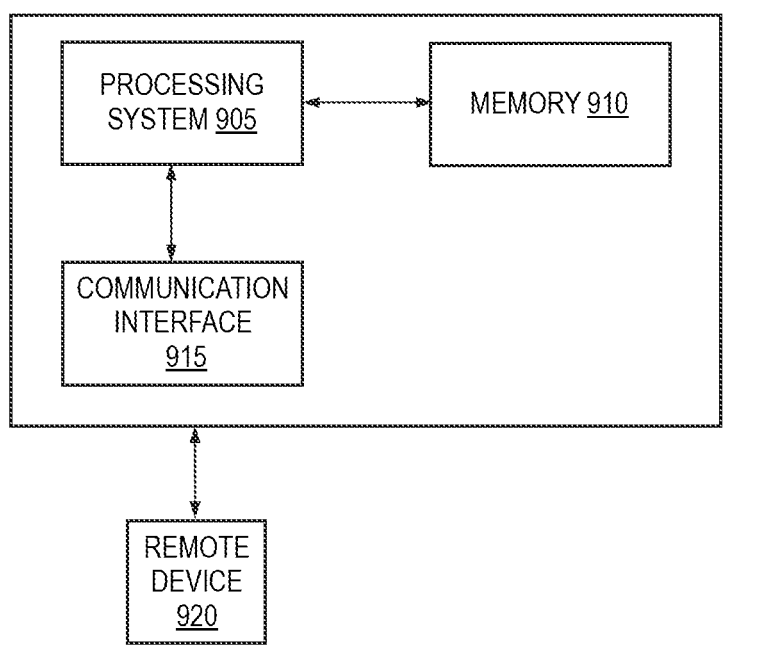
FIG. 9 is a simplified block diagram of a payment server, in accordance with an example embodiment of the present disclosure.

FIG. 9 is a simplified block diagram of a payment server 900, in accordance with an embodiment of the present disclosure. The payment server 900 is an example of the payment server 116 of FIG. 1. A payment network may be used by the payment server 900 as a payment interchange network. Examples of payment interchange network include, but not limited to, Mastercard® payment system interchange network. The payment server 900 includes a processing system 905 configured to extract programming instructions from a memory 910 to provide various features of the present disclosure. Further, two or more components may be embodied in one single component, and/or one component may be configured using multiple sub-components to achieve the desired functionalities. Some components of the payment server 900 may be configured using hardware elements, software elements, firmware elements and/or a combination thereof. In one embodiment, the payment server 900 is configured to predict a combination of one or more authorizing components to be applied to the payment transaction to obtain a product recommendation strategy for the payment transaction and provide the product recommendation strategy to the issuer 108 along with real-time payment authorization request.

Via a communication interface 915, the processing system 905 receives information from a remote device 920 such as the transaction database 118, the issuer 108, or administrators managing server activities. The payment server 900 may also perform similar operations as performed by the server system 200. For the sake of brevity, the detailed explanation of the payment server 900 is omitted herein with reference to the FIG. 2.

Figure 10:
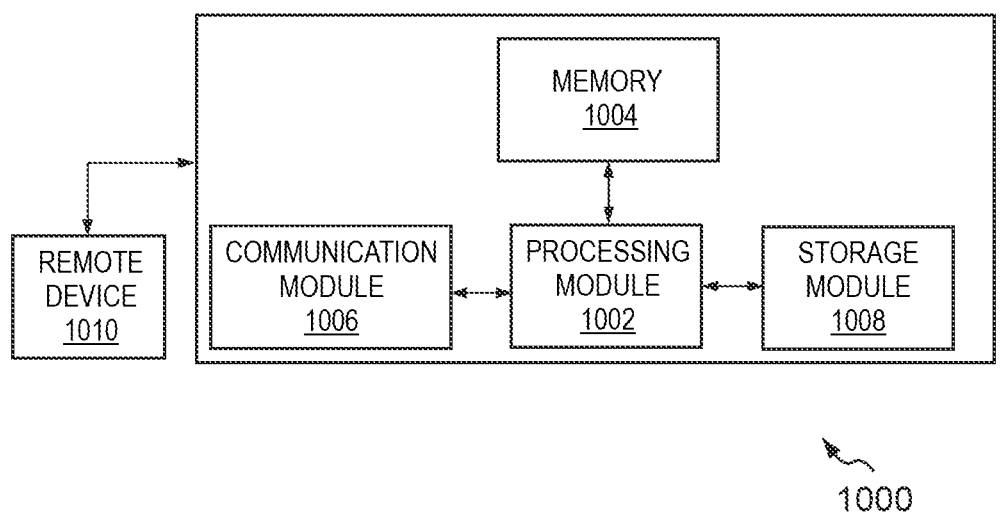
FIG. 10 is a simplified block diagram of an issuer server, in accordance with an example embodiment of the present disclosure.

FIG. 10 is a simplified block diagram of an issuer server 1000 of the cardholder 120, in accordance with an embodiment of the present disclosure. The issuer server 1000 is an example of the issuer 108 of FIG. 1, or may be embodied in the issuer 108. The issuer server 1000 is associated with an issuer bank/issuer, in which a cardholder (e.g., the cardholder 120) may have a payment account, which provides a payment card. The issuer server 1000 includes a processing module 1002 operatively coupled to a storage module 1008 and a communication module 1006. The components of the issuer server 1000 provided herein may not be exhaustive and that the issuer server 1000 may include more or fewer components than that of depicted in FIG. 10. Further, two or more components may be embodied in one single component, and/or one component may be configured using multiple sub-components to achieve the desired functionalities. Some components of the issuer server 1000 may be configured using hardware elements, software elements, firmware elements and/or combination thereof.

The storage module 1008 is configured to store machine executable instructions to be accessed by the processing module 1002. Additionally, the storage module 1008 stores information related to, contact information of the user, bank account number, availability of funds in the account, payment card details, transaction details and/or the like.

The processing module 1002 is configured to communicate with one or more remote devices such as a remote device 1010 using the communication module 1006 over a network, such as the network 110 of FIG. 1. The examples of the remote device 1012 include the user device 122, the payment server 116 or other computing systems of issuer and the network 110 and the like. The communication module 1006 is capable of facilitating such operative communication with the remote devices and cloud servers using API (Application Program Interface) calls. The processing module 1002 receives a payment card information, a payment transaction amount, a customer information and merchant information in remote device 1010 (i.e. the payment server 116).

The processing module 1002 is configured to receive a product recommendation strategy along with a payment authorization request and apply one or more authorizing components included in the product recommendation strategy to transaction data of the payment authorization request. Thus, applying the most optimal authorizing components to the payment authorization request leads to high approval rates and less chances of fraud activities.

The disclosed method 800 with reference to FIG. 8, or one or more operations of the server system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A server system, comprising:
a memory comprising executable instructions; and
a processor operationally coupled to the memory, the processor configured to:
access historical transaction data associated with a merchant, the historical transaction data including transaction-level data of past payment transaction requests and product information which were applied to the past payment transaction requests;
aggregate the past payment transaction requests according to specific data elements;
obtain past payment transaction features based on the aggregated past payment transaction requests;
receive, by a data pre-processing engine, a payment authorization request for a payment transaction between a cardholder and a merchant in real time, and identify payment transaction features associated with the payment transaction based, at least in part, on the payment authorization request;
predict, by a reinforcement learning (RL) agent, a combination of one or more authorizing components to be applied to the payment transaction to obtain an authorization decision product recommendation strategy for the payment transaction, the combination of the one or more authorizing components predicted based, at least in part, on application of a trained deep RL model to the payment transaction features,
wherein the deep RL model is trained based, at least, on the obtained past payment transaction features and authorization decision products applied to the past payment transaction requests by:
defining a state space of the deep RL model that includes a plurality of states,
defining an action space of the deep RL model that includes a plurality of actions,
calculating a reward value that is obtained in any state using a reward function, the reward function representing a reward value of a state after performing an action, the reward function further being a function of (i) a probability of approval of a transaction, (ii) a probability of the transaction being fraud (iii) a cost incurred on applying a product on the transaction and (iv) a summation of total cost of all products that are applied to the payment transaction, wherein the probability of approval of a transaction and the probability of the transaction being fraud are determined based on the obtained payment transaction features, and
transmit the payment authorization request and the obtained authorization decision product recommendation strategy to an issuer associated with the cardholder.

2. The server system as claimed in claim 1, wherein the payment transaction features comprise one or more of: an issuer identifier, a merchant category code (MCC), a cross-border transaction flag, and a payment card type.

3. The server system as claimed in claim 1, wherein the processor is further configured to:
determine authorizing components to be applied on a given transaction to maximize the probability of approval and minimize the probability of fraud.

4. The server system as claimed in claim 1, wherein the historical transaction data comprises transaction-level data associated with past payment transaction requests and authorizing components applied by the issuer to the past payment transaction requests.

5. The server system as claimed in claim 1, wherein, to predict the combination of the one or more authorizing components to be applied to the payment transaction, the RL agent is further operable to:
determine a state in the deep RL model based, at least in part, on the payment transaction features, set application of a candidate number of authorizing components to the payment transaction as actions in the deep RL model, calculate Q-values corresponding to state-action pairs formed by the state and the actions using a neural network of the deep RL model, select an action based, at least in part, on the calculated Q-values, wherein the selected action represents application of a candidate authorizing component to the payment transaction, calculate a reward value corresponding to the selected action based, at least in part, on the reward function, and add the candidate authorizing component corresponding to the reward value satisfying a predefined condition into the authorization decision product recommendation strategy.

6. The server system as claimed in claim 1, wherein each state corresponds to a particular transaction feature and a product flag vector, and each action corresponds to applying a product to a payment transaction.

7. The server system as claimed in claim 1, wherein the server system is a payment server associated with a payment network.

8. The server system as claimed in claim 1, wherein the payment transaction is a card-not-present (CNP) payment transaction.

9. A computer-implemented method, comprising:

accessing historical transaction data associated with a merchant, the historical transaction data including transaction-level data of past payment transaction requests and product information which were applied to the past payment transaction requests;

aggregating the past payment transaction requests according to specific data elements;

obtaining past payment transaction features based on the aggregated past payment transaction requests;

receiving, by a server system, a payment authorization request for a payment transaction between a cardholder and a merchant in real time;

identifying, by the server system, payment transaction features associated with the payment transaction based, at least in part, on the payment authorization request;

predicting, by a reinforcement learning (RL) agent, a combination of one or more authorizing components to be applied to the payment transaction to obtain an authorization decision product recommendation strategy for the payment transaction, the combination of the one or more authorizing components predicted based, at least in part, on application of a trained deep RL model to the payment transaction features;

wherein the deep RL model is trained based, at least, on the obtained past payment transaction features and authorization decision products applied to the past payment transaction requests by:

defining a state space of the deep RL model that includes a plurality of states, defining an action space of the deep RL model that includes a plurality of actions, calculating a reward value that is obtained in any state using a reward function, the reward function representing a reward value of a state after performing an action, the reward function further being a function of (i) a probability of approval of a transaction, (ii) a probability of the transaction being fraud (iii) a cost incurred on applying a product on the transaction and (iv) a summation of total cost of all products that are applied to the payment transaction, wherein the probability of approval of a transaction and the probability of the transaction being fraud are determined based on the obtained payment transaction features, and transmitting, by the server system, the payment authorization request and the obtained authorization decision product recommendation strategy to an issuer associated with the cardholder.

10. The computer-implemented method of claim 9, wherein the payment transaction features comprise one or more of: an issuer identifier, a merchant category code (MCC), a cross-border transaction flag, and a payment card type.

11. The computer-implemented method of claim 9, wherein each state corresponds to a particular transaction feature and a product flag vector, and each action corresponds to applying a product to a payment transaction.

12. The computer-implemented method of claim 9, wherein the historical transaction data comprises transaction-level data associated with past payment transaction requests and authorizing components applied by the issuer to the past payment transaction requests.

13. The computer-implemented method of claim 9, wherein predicting the combination of the one or more authorizing components to be applied to the payment transaction further comprises:

setting, by the server system, application of a candidate number of authorizing components to the payment transaction as a set of actions of the plurality of actions;

calculating, by the server system, Q-values corresponding to state-action pairs formed by a set of states of a plurality of states resulting from corresponding set of actions of the plurality of actions;

selecting, by the server system, an action based, at least in part, on the calculated Q-values, wherein the selected action represents application of a candidate authorizing component to the payment transaction;

calculating, by the server system, a reward value corresponding to the selected action based, at least in part, on the reward function; and adding, by the server system, the candidate authorizing component corresponding to the reward value satisfying a predefined condition into the authorization decision product recommendation strategy.

14. The computer-implemented method of claim 13, wherein the server system determines authorizing components to be applied on a given transaction to maximize the probability of approval and minimize the probability of fraud.

15. The computer-implemented method of claim 9, wherein the server system is a payment server associated with a payment network.

16. The computer-implemented method of claim 9, wherein the payment transaction is a card-not-present (CNP) payment transaction.

17. One or more non-transitory computer readable media comprising computer-executable instructions that, when executed by a processor, perform operations comprising:

accessing historical transaction data associated with a merchant, the historical transaction data including transaction-level data of past payment transaction requests and product information which were applied to the past payment transaction requests;

aggregating the past payment transaction requests according to specific data elements;

obtaining past payment transaction features based on the aggregated past payment transaction requests;

receiving, by a server system, a payment authorization request for a payment transaction between a cardholder and a merchant in real time;

identifying, by the server system, payment transaction features associated with the payment transaction based, at least in part, on the payment authorization request;

predicting, by a reinforcement learning (RL) agent, a combination of one or more authorizing components to be applied to the payment transaction to obtain an authorization decision product recommendation strategy for the payment transaction, the combination of the one or more authorizing components predicted based, at least in part, on application of a trained deep RL model to the payment transaction features;

wherein the deep RL model is trained based, at least, on the obtained past payment transaction features and authorization decision products applied to the past payment transaction requests by:

defining a state space of the deep RL model that includes a plurality of states, defining an action space of the deep RL model that includes a plurality of actions, calculating a reward value that is obtained in any state using a reward function, the reward function representing a reward value of a state after performing an action, the reward function further being a function of (i) a probability of approval of a transaction, (ii) a probability of the transaction being fraud (iii) a cost incurred on applying a product on the transaction and (iv) a summation of total cost of all products that are applied to the payment transaction, wherein the probability of approval of a transaction and the probability of the transaction being fraud are determined based on the obtained payment transaction features, and transmitting, by the server system, the payment authorization request and the obtained authorization decision product recommendation strategy to an issuer associated with the cardholder.

18. The one or more non-transitory computer readable media of claim 17, wherein predicting the combination of the one or more authorizing components to be applied to the payment transaction further comprises:

setting, by the server system, application of a candidate number of authorizing components to the payment transaction as a set of actions of the plurality of actions;

calculating, by the server system, Q-values corresponding to state-action pairs formed by a set states of a plurality of states resulting from corresponding set of actions;

selecting, by the server system, an action based, at least in part, on the calculated Q-values, wherein the selected action represents application of a candidate authorizing component to the payment transaction;

calculating, by the server system, a reward value corresponding to the selected action based, at least in part, on the reward function; and adding, by the server system, the candidate authorizing component corresponding to the reward value satisfying a predefined condition into the authorization decision product recommendation strategy.

19. The one or more non-transitory computer readable media of claim 18, wherein each state corresponds to a particular transaction feature and a product flag vector, and each action corresponds to applying a product to a payment transaction.

20. The one or more non-transitory computer readable media of claim 17, wherein the payment transaction is a card-not-present (CNP) payment transaction.

* * * * *